Figure 1:
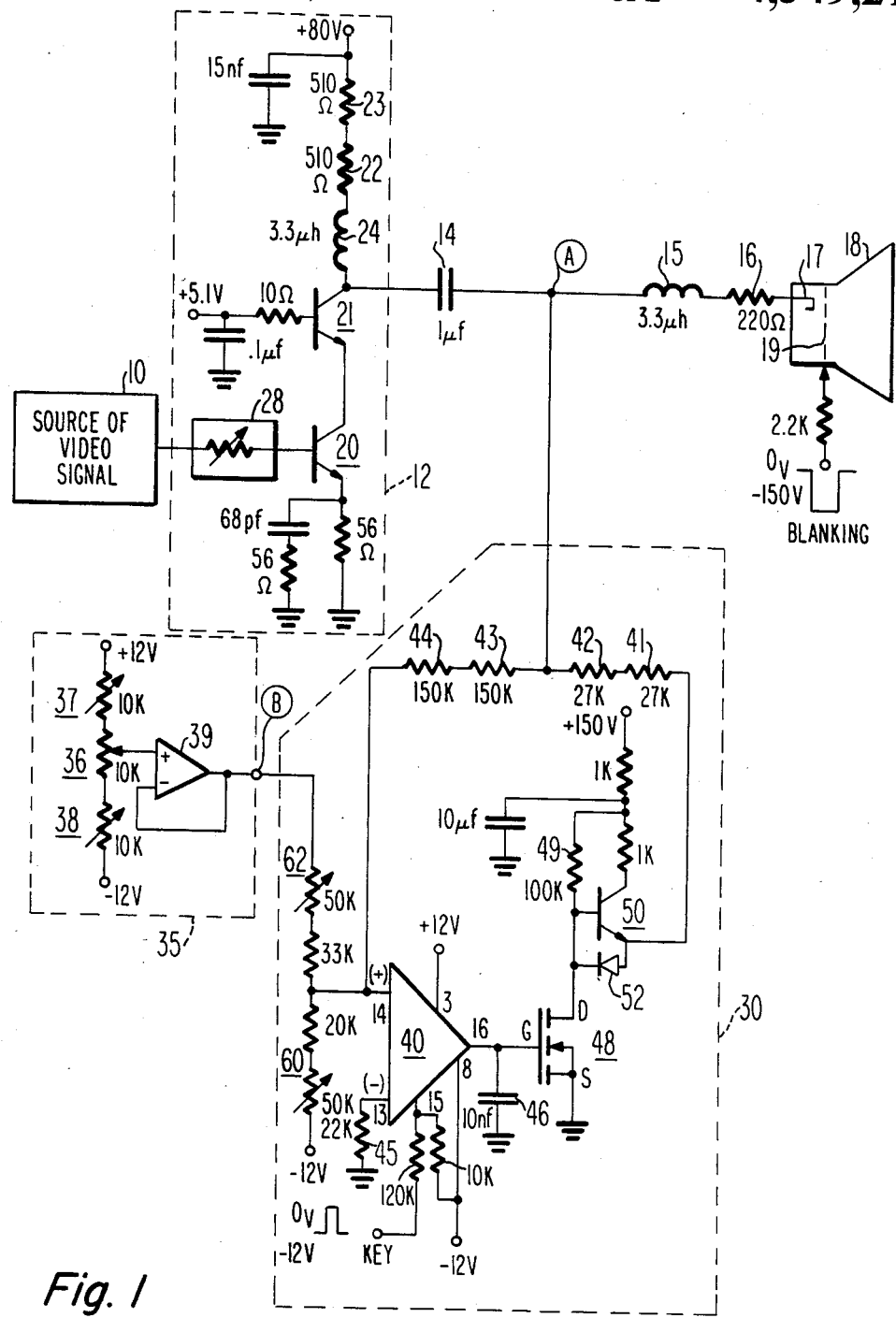

United States Patent [19]

Hinn

[11] Patent Number: 4,549,214
[45] Date of Patent: Oct. 22, 1985

[54] VIDEO SIGNAL DC RESTORATION CIRCUIT

[75] Inventor: Werner Hinn, Zollikerberg, Switzerland

[73] Assignee: RCA Corporation, Princeton, N.J.

[21] Appl. No.: 549,478

[22] Filed: Nov. 7, 1983

[51] Int. Cl.[4] .................. H04N 5/16; H04N 5/06
[52] U.S. Cl. ..................... 358/172; 358/34; 358/171; 328/150; 307/264
[58] Field of Search ............. 358/172, 34, 171, 173; 328/150, 151; 307/264, 553

[56] References Cited

U.S. PATENT DOCUMENTS

| | | | |
|---|---|---|---|
| 2,718,550 | 9/1955 | Hoyt et al. | 358/171 X |
| 2,825,758 | 3/1958 | Revercomb | 358/171 |
| 2,873,314 | 2/1959 | Avins | 358/171 |
| 3,647,944 | 3/1972 | Anderson | 358/34 |
| 4,082,996 | 4/1978 | Hinn | 358/242 |
| 4,285,008 | 8/1981 | Osawa et al. | 358/65 |
| 4,442,458 | 4/1984 | Barter | 358/172 |

OTHER PUBLICATIONS

Milton S. Kiver, Modern Television Receiver, Mar., 1949, pp. 66-72, 138-140.
Oliver K. Allen, A Simple Inexpensive DC Restorer, Apr., 1961, pp. 200-202.
Copending U.S. patent application Ser. No. 532,333 of Robert L. Rodgers, III, titled "Brightness Control Network in a Video Signal Processor with A.C. Coupled Output Stages".

Primary Examiner—John C. Martin
Assistant Examiner—Anne Toth
Attorney, Agent, or Firm—P. J. Rasmussen; P. M. Emanuel; R. H. Kurdyla

[57] ABSTRACT

In a wideband video signal processing system, video output signals from a video driver amplifier are passively AC coupled to an intensity control electrode of an image display device. A keyed feedback DC restoration circuit is connected to the intensity control electrode via a high impedance resistor network comprising the feedback path of the restoration circuit. Image brightness control is accomplished via the restoration circuit without varying the operating point of the driver amplifier.

17 Claims, 2 Drawing Figures ized system. Also in such systems,
VIDEO SIGNAL DC RESTORATION CIRCUIT

This invention concerns a circuit for restoring the DC component of a video signal in a video signal processing and display system such as a television receiver including an image display kinescope. In particular, this invention concerns a DC restoration circuit associated with a wide bandwidth kinescope driver amplifier.

Conventional television receivers for processing broadcast television signals, e.g., according to NTSC broadcast standards as used in the United States, are intended to process video signals with a bandwidth limited to approximately 4.2 MHz at the high frequency extreme. Accordingly, driver amplifiers for an image display kinescope in such systems must exhibit a corresponding bandwidth capability. Also in such systems, the DC bias for the intensity control electrodes of the kinescope is often adjusted by varying the operating point and output DC bias condition of the kinescope driver amplifiers, for the purpose of setting the black image representative current level of the kinescope, as well as for establishing a desired brightness level for an image reproduced by the kinescope. Brightness control is typically accomplished in accordance with the setting of a manual, viewer operated brightness control which causes the DC level of output signals from the kinescope driver to vary.

Recent trends towards high definition video signal display systems with significantly increased picture resolution capability, including high resolution television receivers and teletext and data display monitors, dictate the need for a video signal processing system with significantly wider signal bandwidth capability compared to conventional systems, and wide bandwidth kinescope driver stages in particular. Many wideband kinescope driver amplifiers exhibit smaller output impedances and greater output current levels compared to the driver amplifiers employed in conventional bandwidth systems. In wideband driver amplifiers it is desirable to maintain a substantially fixed DC bias to avoid several problems, as follows.

Bias variations such as produced in response to the variable setting of the brightness control and other adjustments require a driver amplifier supply voltage large enough to accommodate output DC level shifts associated with such adjustments. Such large supply voltages are undesirable in a wideband kinescope driver because of the resulting increased power consumption and dissipation which would result for a wideband driver already operating at increased DC current levels. In addition, wideband driver transistors sometimes exhibit low voltage ratings which do not permit the use of a larger supply voltage required to accommodate DC output voltage shifts. Bias voltage variations also influence the capacitance parameters of the driver amplifier transistors, undesirably causing operating bandwidth variations with shifts in transistor DC bias. The driver transistor operating bandwidth capability also varies with the current gain of the transistor, which is a function of transistor bias current.

To avoid the problems associated with DC bias variations as noted above, some wideband video display systems employ capacitor coupling between the output of the driver amplifier and the kinescope, and a DC restoration network associated with the output coupling capacitor. DC restoration circuits of this type are disclosed, for example, in U.S. Pat. No. 4,082,996—Hinn, and in U.S. Pat. No. 4,285,008—Osawa, et al.

Output DC restoration circuits of the type used by Osawa, et al., which include a diode clamp circuit, exhibit several disadvantages. During active picture information intervals of the video signal the diode is reverse biased and exhibits a capacitance which, depending on the diode type and the magnitude of the reverse bias voltage across the diode, can adversely affect the frequency response of the video output circuit particularly in the case of a wideband system. Diode clamping circuits are also subject to introducing clamping errors caused by diode current during the clamping interval, which current causes a voltage drop across the output impedance of the associated kinescope driver amplifier that can lead to differential cutoff errors of the kinescope electron guns. In a color television receiver differential cutoff errors can produce unwanted coloration in dark gray areas of a reproduced picture if the average beam currents associated with plural color signals applied to the kinescope electron guns are unequal. In many wideband kinescope driver designs the output impedance of the driver amplifier is not small enough to make the clamping error negligible. In addition, with diode clamping circuits a certain amount of black level "sag", or change, over each horizontal image line may result due to charging of the coupling capacitor by kinescope beam current (i.e., cathode current) during horizontal line image intervals. This effect is particularly undesirable in high resolution wideband systems.

The kinescope driver and associated DC restoration circuit disclosed in the Hinn patent employs a high voltage, high frequency emitter follower transistor which receives capacitively AC coupled video signals from a preceding video output voltage gain stage. The emitter follower transistor is coupled to a feedback DC restoration circuit and conveys DC restored video output signal to the kinescope. Although this circuit avoids some of the problems associated with diode clamping circuits, it exhibits some limitations. In certain situations the use of such an emitter follower coupling transistor may not reduce capacitive loading of the preceding video output amplifier enough to justify the use of an additional high voltage emitter follower coupling transistor, particularly as the system high frequency limit approaches the gain-bandwidth product frequency ($f_t$) of the transistor. Furthermore, total power consumption will be increased if a small emitter resistance is required in critical wideband applications to ensure symmetrical video signal rise and fall times.

In any case, for brightness control purposes it is undesirable in wideband kinescope driver systems to insert a variable, brightness controlling DC level, e.g., a variable blanking level, into the video signal prior to the driver stage. Such a variable brightness controlling level requires that the kinescope driver amplifier exhibit additional dynamic range with an attendant increase in the amplifier supply voltage and power consumption.

Accordingly, there is disclosed herein a DC restoration circuit advantageously used in conjunction with a wideband, AC coupled kinescope driver amplifier. The disclosed circuit avoids the problems associated with diode clamp circuits as noted previously, and does not require an additional wideband emitter follower device in the kinescope drive signal path. Specifically, the disclosed circuit advantageously does not produce a significant increase in power consumption, exhibits reduced capacitive loading of the driver amplifier to maintain the wideband capability of the system, and offers an image brightness control capability which does not require extra driver amplifier dynamic range and attendant higher operating supply voltage and power consumption.

The disclosed DC restoration circuit in accordance with the principles of the present invention comprises a restoration circuit, such as a keyed feedback circuit, with input and output coupled to a signal path by which video output signals are AC coupled from a video driver amplifier to an intensity control electrode of an image display device. In accordance with a feature of the invention, the restoration circuit is passively coupled to the video output signal path via a high impedance resistive network in the feedback path of the restoration circuit. In accordance with a further feature of the invention, DC restored video signals are passively coupled to the intensity control electrode of the display device.

Figure 2:
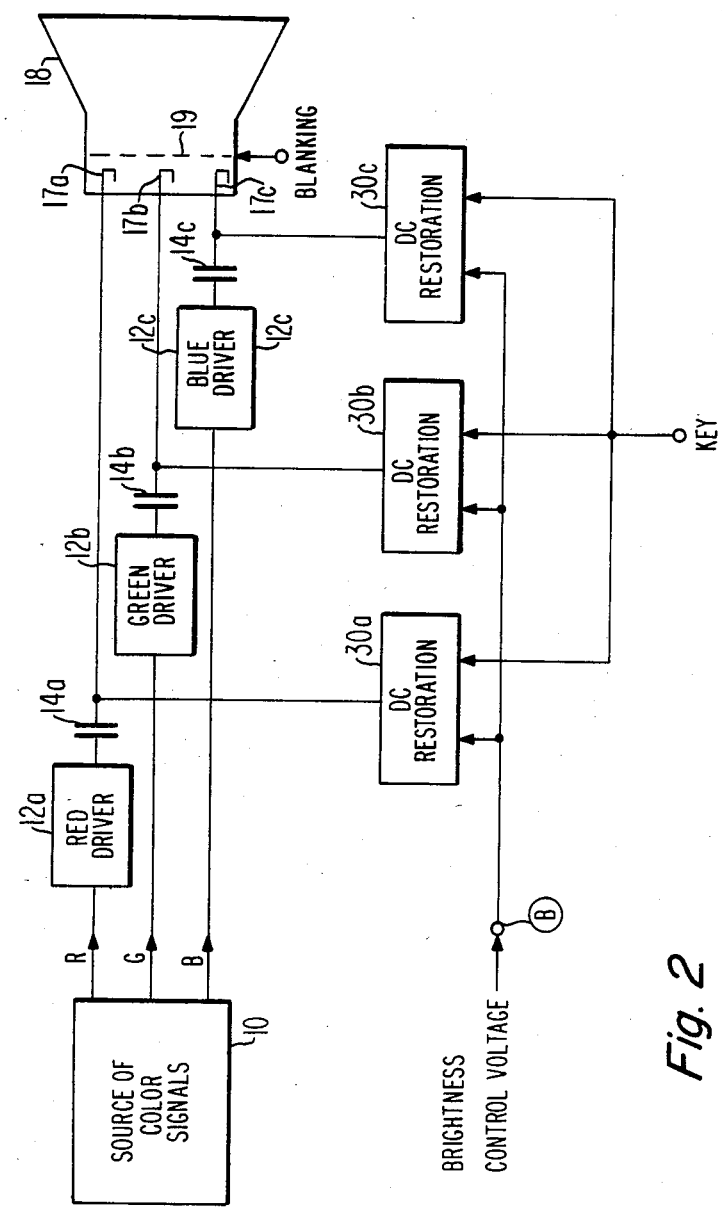

In the drawing:

FIG. 1 shows a portion of a television receiver including an AC coupled kinescope driver amplifier and an associated video signal DC restoration network in accordance with the present invention; and FIG. 2 shows, in block diagram form, an implementation of the DC restoration network in a color television receiver which provides plural color signals to respective signal input electrodes of a color kinescope.

In FIG. 1, video signals from a source 10 are applied to a wideband video output kinescope driver amplifier 12, which provides high level output video signals suitable for driving the cathode electrode of an image reproducing kinescope. The video output signals are conveyed via an AC signal coupling capacitor 14, a peaking coil 15 and a current limiting resistor 16 to a cathode electrode 17 of a kinescope 18. A control gird 19 is associated with the cathode electrode and forms a kinescope electron gun therewith. Blanking of kinescope 18 during image blanking intervals is accomplished in response to a negative BLANKING pulse applied to grid 19.

Kinescope driver 12 includes a low voltage input common emitter amplifier transistor 20 arranged in a cascode amplifier configuration with a high voltage output common base amplifier transistor 21 which provides video output signals from the collector circuit thereof. The output collector circuit of transistor 21 includes plural series load resistors 22,23 and a peaking coil 24. It has been found that the use of plural load resistors (rather than a single load resistor) in the collector circuit of transistor 21 assists to reduce the effects of parasitic capacitances upon the desired wide bandwidth capability of driver 12, which in this case is on the order of 25 MHz for a video output signal peak-to-peak amplitude of 40 volts. Output transistor 21 is a relatively high voltage device such as the BF 869 type transistor commercially available from Siemens (West Germany). A suitable transistor type for input transistor 20 is the commonly available 2N2219A. An input signal coupling circuit 28 includes a variable resistance for adjusting the signal gain of driver 12 during alignment of the system.

In accordance with the present invention a DC restoration circuit 30 is coupled to AC coupling capacitor 14 at node A in the kinescope cathode signal coupling path. Restoration circuit 30 comprises a keyed feedback network which also exhibits image brightness control capability in response to a variable brightness control voltage provided at a node B from a source of brightness control voltage 35. The feedback restoration circuit includes an amplifier 40, storage capacitor 46, voltage translating and coupling transistors 48 and 50, and a plurality of relatively high value series feedback resistors 41–44 (e.g., metal film devices). The junction of feedback resistors 42 and 43 is connected to capacitor 14 in the cathode signal path at node A, which corresponds to a single interface terminal by which restoration circuit 30 is connected to the cathode signal path. Source 35 includes an adjustable potentiometer 36 which corresponds to a manual, viewer operated brightness control. A variable brightness control voltage provided from the wiper of control 36 is coupled via a voltage follower stage 39 to node B. Adjustable resistors 37 and 38 are pre-set to establish the minimum and maximum limits of the brightness control range.

Amplifier 40 in the restoration network is a keyed, differential input, operational transconductance amplifier (OTA) comprising a portion of the CA 3060 type integrated circuit commercially available from the Solid State Division of RCA Corporation. A non-inverting signal input (+) of amplifier 40 is a virtual ground current summing point and is coupled to the output of brightness control network 35 via node B. An inverting input (−) of amplifier 40 is coupled to a reference potential (ground) via a resistor 45. A high impedance current output of amplifier 40 is coupled to storage capacitor 46. Amplifier 40 is keyed to conduct in response to a KEY pulse during the so-called "back porch" interval of each horizontal line blanking interval of the video signal, at which time the feedback restoration network is rendered operative for voltage sensing and control purposes.

The voltage on storage capacitor 46 is representative of the difference between the voltage level at the non-inverting input of amplifier 40 relative to the reference voltage level at the inverting input, and is applied to the gate (G) input of high voltage, high input impedance MOS FET (Field Effect Transistor) 48 with a drain (D) output electrode and a grounded source (S) electrode. The output circuit of transistor 48 includes a resistor 49 across which is developed an amplified version of the representative voltage on capacitor 46, and low output impedance emitter follower transistor 50 which couples the voltage across resistor 49 to resistors 41 and 42. These resistors form a voltage divider with resistors 43,44 for maintaining a restored DC level on capacitor 14 at node A in accordance with the voltage level at the non-inverting input of amplifier 40, e.g., in accordance with the setting of brightness control 36, as will be discussed.

The voltage level at the non-inverting input of amplifier 40 is also influenced by the setting of adjustable resistors 60 and 62. Resistor 60 is a kinescope "cut-off" level control which is preset e.g., during manufacturing alignment of the system, to establish the kinescope cut-off level for a given setting of brightness control 36. Resistor 62 is a preset "brightness tracking" control which is adjusted during system alignment in accordance with the setting of driver gain control 28. Adjustment of resistor 62 produces a desired image brightness characteristic in accordance with the driver gain setting, and is particularly required in color image display systems, such as shown in FIG. 2, to ensure proper kinescope drive ratios and white image balance for all brightness levels.

The black level voltage across cathode signal coupling capacitor 14 as developed during image blanking intervals is the difference between the black level voltage at the collector of video output transistor 21, and the black level voltage at the kinescope cathode at node A which is maintained by the action of restoration network 30. The black level voltage is equal to the kinescope cut-off voltage plus an image brightness representative voltage component with a magnitude proportional to the setting of viewer brightness control 36. The cathode black level voltage is related to the current flowing in the emitter circuit of transistor 50, through the series combination of resistors 41-44, to the non-inverting input of amplifier 40.

When amplifier 40 is keyed to conduct during the "back porch" black level control interval of each horizontal line blanking interval, a feedback path comprising transistors 48 and 50 and resistors 41-44 is formed from the output to the non-inverting input of amplifier 40. At this time the output of amplifier 40 charges or discharges storage capacitor 46 as a function of any voltage imbalance which exists between the non-inverting input and the inverting input of amplifier 40. Amplifier 40 will supply current to, or sink current from, storage capacitor 46 as required to obtain a zero voltage differential between the inputs of amplifier 40, corresponding to a desired black level condition. When this condition is achieved, the output current from amplifier 40 is zero since the amplifier inputs are balanced. Accordingly, the voltage developed at node A, as derived from the feedback loop at the junction of voltage divider resistors 42 and 43, establishes a charge on capacitor 14 such that the kinescope cathode bias voltage corresponds to the desired black level bias voltage. In this regard the voltage stored on capacitor 46 drives transistors 48 and 50 such that the desired black level voltage is established at the cathode electrode via node A by means of current conducted by resistors 41 and 42. Positive currents conducted by resistors 41, 42 flow from the emitter of transistor 50, while negative currents conducted by resistors 41, 42 flow through a diode 52 and transistor 48 to ground.

The black level bias voltage and thereby the brightness of a reproduced image can be modified by varying the voltage applied to the non-inverting input of amplifier 40 via brightness control 36. Adjustment of control 36 causes a change in the feedback current flowing in resistors 41-44 during the black level control interval such that a related change in the black level voltage at point A results when the feedback loop returns to a balanced input condition. A new black level voltage then appears at point A, consistent with the setting of brightness control 36.

The described system exhibits several significant features related to the manner in which DC restoration and brightness control are implemented, and to the manner in which the restoration circuit is resistively coupled to the cathode signal path, as follows.

The described brightness control technique eliminates the need for a variable brightness representative black level in the video signal processed by driver stage 12. Thus the kinescope driver amplifier is not required to exhibit additional dynamic range, and associated larger operating supply voltage and increased power consumption, which would otherwise be needed to accommodate shifts in the amplifier operating point resulting from such variable black level. In this regard it is also noted that blanking during image blanking intervals is accomplished via the BLANKING signal applied to the kinescope, rather than by blanking the video signal prior to the kinescope driver amplifier. Such kinescope blanking also eliminates the need for the kinescope driver to accommodate operating point shifts during blanking intervals.

The desired wideband signal drive capability of the system is preserved since coupling of the restoration circuit to the cathode signal path via high impedance resistors 41-44 significantly reduces the capacitive loading of the kinescope driver stage, compared to alternative techniques using diode or high voltage transistor coupling of the restoration circuit to the cathode path. The high impedance resistor coupling leads to reduced loading of the kinescope driver stage output, and produces less power dissipation in resistors 41-44, driver amplifier transistor 21 and transistor 50. To further reduce the bandwidth limiting effects of parasitic capacitances, plural series feedback resistors are used for each segment of the feedback voltage divider, e.g., plural resistors 41 and 42 are used rather than a single resistor having a value corresponding to the combined values of resistors 41 and 42. The reduced capacitance high impedance resistive coupling preserves the driver amplifier fast slew rate and substantially avoids RC loading of the driver amplifier to permit a wide linear operating range for the amplifier. The values of resistor pairs 41, 42 and 43, 44 are preferably much larger than the value of the load impedance of the driver amplifier as formed by resistors 22 and 23. Also, it is desirable for resistors 43,44 to exhibit values significantly greater than the values of resistors 41,42 so that little voltage attenuation occurs from the emitter of transistor 50 to node A at the kinescope cathode, and so that the operating supply voltage associated with transistors 48 and 50 (+150 volts) can be kept as low as possible consistent with the need to provide sufficient black level adjustment range.

The feedback control action of the described DC restoration circuit provides accurate DC restoration and avoids clamping errors that can be introduced by diode clamping circuits. Such clamping errors can lead to differential cutoff errors of the kinescope electron guns in a color television receiver, and are particularly undesirable in high resolution, wideband video display systems.

In addition, coupling of the DC restored video signal to the kinescope cathode by active circuits, such as via a wideband high voltage emitter follower transistor stage, is advantageously not required.

FIG. 2 shows a portion of a color television receiver including plural DC restoration networks of the type described in connection with FIG. 1.

Color signal source 10 provides plural red (R), green (G) and blue (B) color image signals to respective kinescope driver amplifiers 12a, 12b and 12c. High level color signals from each of the driver stages are AC coupled via respective capacitors 14a, 14b and 14c to cathode electrodes 17a, 17b and 17c of a kinescope 18 having a control grid 19 biased in common with respect to each of the cathode electrodes. In this illustration kinescope 18 is of the self-converging, "in-line" gun type with plural electron guns respectively formed by separate cathode electrodes in combination with commonly biased grid 19.

Plural DC restoration and brightness control networks 30a, 30b and 30c are respectively associated with the separate cathode signal paths and are coupled to capacitors 14a, 14b and 14c. A brightness control voltage and a blanking interval KEY pulse are applied in common to each of the DC restoration networks.

What is claimed is:

1. In a video signal processing system including an image reproducing device for displaying video information in response to video signals applied to an intensity control drive electrode thereof; and a driver amplifier stage including an output load impedance, apparatus comprising:

means for AC coupling video signals from an output of said driver amplifier;

a source of keying signals occuring during video signal blanking intervals;

video signal DC restoration means having an input circuit including a reference input coupled to a reference potential and a signal input, and having a signal output coupled to said signal input via a feedback path exclusive of said image reproducing device, said restoration means being rendered operative in response to said blanking interval keying signals;

means for passively coupling video signals from said AC coupling means to said intensity control electrode via a drive signal path; and means for coupling said feedback path of said restoration means to said drive signal path.

2. Apparatus according to claim 1, wherein said feedback path comprises plural resistance means; and said drive signal path is coupled to said feedback path intermediate to said plural resistance means.

3. Apparatus according to claim 1, wherein said feedback path comprises first resistor means and second resistor means coupled in series in the order named from said signal output to said signal input of said restoration means; and said drive signal path is coupled to said feedback path intermediate to said first and second resistor means.

4. Apparatus according to claim 3, wherein the impedance presented to said drive signal path by said first and second resistor means is greater than said output load impedance of said driver amplifier stage.

5. Apparatus according to claim 4, wherein the impedance of said second resistor means is greater than the impedance of said first resistor means.

6. Apparatus according to claim 3, wherein said first and second resistor means each comprises plural resistors.

7. Apparatus according to claim 1, wherein a source of variable image brightness control voltage is coupled to said input circuit of said restoration means.

8. Apparatus according to claim 1, wherein said image reproducing device includes a kinescope having a cathode electrode corresponding to said intensity control electrode, and a grid electrode associated with said cathode electrode; and a source of image blanking pulses is coupled to grid electrode to effect video image blanking during image blanking intervals.

9. In a video signal processing system including an image reproducing device for displaying video information in response to video signals applied to an intensity control drive electrode thereof; and a driver amplifier stage including an output load impedance, apparatus comprising:

means for AC coupling video signals from an output of said driver amplifier;

a source of keying signals occuring during video signal blanking intervals;

video signal DC restoration means having an input circuit including a reference input coupled to a reference potential and a signal input, and having a signal output coupled to said signal input via a feedback path, said restoration means being rendered operative in response to said blanking interval keying signals;

means for passively coupling video signals from said AC coupling means to said intensity control electrode via a drive signal path; and means for coupling said feedback path of said restoration means to said drive signal path; wherein said restoration means comprises an amplifier with differential inputs respectively corresponding to said signal and reference inputs, and an output;

a charge storage device coupled to said amplifier output;

translating means having an input coupled to said storage device, and an output; and plural resistor means included in said feedback path and coupled from said output of said translating means to said signal input of said amplifier; wherein said drive signal path is coupled to said feedback path intermediate to said plural resistor means.

10. Apparatus according to claim 9, wherein the impedance presented by said plural resistor means to said drive signal path is greater than said driver amplifier output load impedance.

11. In a video signal processing system including an image reproducing device for displaying video information in response to video signals applied to an intensity control drive electrode therof; and a driver amplifier stage including an output load impedance, apparatus comprising:

means for AC coupling video signals from an output of said driver amplifier;

means for coupling video signal from said AC coupling means to said intensity control electrode via a drive current path;

DC restoration means for restoring the DC component of video signals conveyed to said intensity control electrode, said DC restoration means comprising an amplifier network with a reference input, a signal input, a signal output, and a feedback network coupled between said signal output and signal input; and resistor means associated with said DC restorer means for coupling said DC restoration means from said feedback network to said drive current path via a single interface terminal.

12. Apparatus according to claim 11, wherein said resistor means exhibits a larger impedance than said load impedance of said driver amplifier.

13. Apparatus according to claim 11, wherein said resistor means comprises first resistor means coupled between said drive current path and said signal input of said amplifier network, and a second resistor means coupled between said drive current path and said signal output of said amplifier network.

14. Apparatus according to claim 13, wherein said first resistor means exhibits an impedance greater than the impedance exhibited by said second resistor means.

15. In a video signal processing system including an image reproducing device for displaying video information in response to video signals applied to an intensity control drive electrode thereof; and a driver amplifier stage including an output load impedance, apparatus comprising:
 means for AC coupling video signals from an output of said driver amplifier;
 means for coupling video signals from said AC coupling means to said intensity control electrode via a drive current path;
 DC restoration means, including an input and an output, for restoring the DC component of video signals conveyed to said intensity control electrode; and
 resistor means for coupling said DC restoration means to said drive current path via a single interface terminal, said resistor means comprising first resistor means coupled between said drive current path and said input of said restoration means, and second resistor means coupled between said drive current path and said output of said restoration means; wherein
 said first resistor means and said second resistor means each comprise plural resistors connected in series.

16. Apparatus according to claim 11, wherein
 a source of variable control voltage for controlling a characteristic of video signals applied to said image reproducing device, is coupled to an input of said amplifier network.

17. In a video signal processing system including an image reproducing device for displaying video information in response to video signals applied to an intensity control drive electrode thereof; and a driver amplifier stage including an output load impedance, apparatus comprising:
 means for AC coupling video signals from an output of said driver amplifier;
 passive means for coupling video signals from said AC coupling means to said intensity control electrode via a drive current path;
 DC restoration means for restoring the DC component of video signals conveyed to said intensity control electrode, said DC restoration means comprising an amplifier network with a reference input, a signal input, a signals output, and a feedback network coupled between said signal output and signal input; and
 resistive means associated with said DC restoration means for coupling said DC restoration means from said feedback network to said drive current path, said resistive means exhibiting a value greater than that exhibited by said driver amplifier load impedance.

* * * * *